(12) United States Patent  (10) Patent No.: US 9,273,218 B2
Liu  (45) Date of Patent: Mar. 1, 2016

(54) COATING FOR AQUEOUS INKJET TRANSFER

(71) Applicant: Xerox Corporation, Norwalk, CT (US)

(72) Inventor: Chu-Heng Liu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 124 days.

(21) Appl. No.: 14/032,996

(22) Filed: Sep. 20, 2013

(65) Prior Publication Data

US 2015/0085036 A1 Mar. 26, 2015

(51) Int. Cl.
*B41J 2/01* (2006.01)
*C09D 103/12* (2006.01)
*B41J 11/00* (2006.01)
*B41J 2/21* (2006.01)
*C09D 5/00* (2006.01)

(52) U.S. Cl.
CPC ............. *C09D 103/12* (2013.01); *B41J 2/2107* (2013.01); *B41J 11/0015* (2013.01); *C09D 5/00* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218

USPC ................ 347/101, 103, 100, 88, 99, 20; 106/31.6, 31.13, 31.27; 523/160, 161
See application file for complete search history.

(56) References Cited

U.S. PATENT DOCUMENTS

| | | |
|---|---|---|
| 4,035,214 A | 7/1977 | Shuppert et al. |
| 4,135,960 A | 1/1979 | Shuppert et al. |
| 4,673,303 A | 6/1987 | Sansone et al. |
| 5,623,296 A | 4/1997 | Fujino et al. |
| 5,750,314 A | 5/1998 | Fromson et al. |
| 6,059,407 A | 5/2000 | Komatsu et al. |
| 6,335,978 B1 | 1/2002 | Moscato et al. |
| 6,357,870 B1 | 3/2002 | Beach et al. |
| 6,709,096 B1 | 3/2004 | Beach et al. |
| 6,713,160 B2 | 3/2004 | Kitamura et al. |
| 7,281,790 B2 | 10/2007 | Mouri et al. |
| 7,686,445 B2 | 3/2010 | Fioravanti et al. |

(Continued)

FOREIGN PATENT DOCUMENTS

| | | |
|---|---|---|
| EP | 0 583 168 B1 | 10/1998 |
| EP | 1 919 711 B1 | 11/2010 |

(Continued)

OTHER PUBLICATIONS

European Search Report and Written Opinion corresponding to European Application No. 14184999.2; European Patent Office, Munich, Germany; Jan. 12, 2015 (6 pages).

*Primary Examiner* — Manish S Shah

(74) *Attorney, Agent, or Firm* — Maginot Moore & Beck LLP

(57) ABSTRACT

A coating composition for an image transfer member in an aqueous ink imaging system is disclosed that comprises a hydrophilic composition and a surfactant. The hydrophilic composition can be a starch-based composition.

20 Claims, 7 Drawing Sheets

(56) References Cited

U.S. PATENT DOCUMENTS

| | | |
|---|---|---|
| 7,869,099 B2 | 1/2011 | Mashtare |
| 8,011,781 B2 | 9/2011 | Taniuchi et al. |
| 8,025,389 B2 | 9/2011 | Yamanobe et al. |
| 8,132,885 B2 | 3/2012 | Ramakrishnan et al. |
| 2002/0196321 A1 | 12/2002 | Katsuki |
| 2003/0107633 A1* | 6/2003 | Sato et al. ............... 347/103 |
| 2004/0218028 A1* | 11/2004 | Furukawa ............... 347/101 |
| 2005/0105939 A1 | 5/2005 | Ferrar et al. |
| 2006/0165974 A1 | 7/2006 | Ferrar et al. |
| 2007/0196580 A1* | 8/2007 | Patil et al. ............... 427/384 |
| 2007/0285486 A1 | 12/2007 | Harris et al. |
| 2008/0032072 A1* | 2/2008 | Taniuchi et al. ......... 347/103 |
| 2009/0080949 A1* | 3/2009 | Yamanobe et al. ...... 347/103 |
| 2011/0234729 A1 | 9/2011 | Noguchi |
| 2012/0013694 A1 | 1/2012 | Kanke |
| 2012/0081485 A1* | 4/2012 | Ohashi ..................... 347/103 |
| 2013/0127965 A1 | 5/2013 | Kushida et al. |
| 2013/0127966 A1 | 5/2013 | Noguchi et al. |

FOREIGN PATENT DOCUMENTS

| | | |
|---|---|---|
| JP | 2767796 B2 | 6/1998 |
| JP | 3169634 A | 5/2001 |
| JP | 2001-212956 A | 8/2001 |
| JP | 4006374 B2 | 11/2001 |
| JP | 2002-138228 A | 5/2002 |
| JP | 3379558 B2 | 2/2003 |
| WO | 93/17000 A1 | 4/1993 |
| WO | 2011-014185 A1 | 2/2011 |

* cited by examiner

COATING FOR AQUEOUS INKJET TRANSFER

CROSS-REFERENCE

This application cross-references co-pending U.S. patent application Ser. No. 14/032,945, which is entitled "SYSTEM AND METHOD FOR IMAGE RECEIVING SURFACE TREATMENT IN AN INDIRECT INKJET PRINTER," and which was filed on Sep. 20, 2013, the contents of which are hereby incorporated by reference in their entirety.

TECHNICAL FIELD

This disclosure relates generally to aqueous indirect inkjet printers, and, in particular, to surface preparation for aqueous ink inkjet printing.

BACKGROUND

In general, inkjet printing machines or printers include at least one printhead that ejects drops or jets of liquid ink onto a recording or image forming surface. An aqueous inkjet printer employs water-based or solvent-based inks in which pigments or other colorants are suspended or in solution. Once the aqueous ink is ejected onto an image receiving surface by a printhead, the water or solvent is at least partially evaporated to stabilize the ink image on the image receiving surface. When aqueous ink is ejected directly onto media, the aqueous ink tends to soak into the media when it is porous, such as paper, and change the physical properties of the media. Because the spread of the ink droplets striking the media is a function of the media surface properties and porosity, the print quality is inconsistent. To address this issue, indirect printers have been developed that eject ink onto a blanket mounted to a drum or endless belt. The ink is at least partially dried on the blanket and then transferred to media. Such a printer avoids the changes in image quality, drop spread, and media properties that occur in response to media contact with the water or solvents in aqueous ink. Indirect printers also reduce the effect of variations in other media properties that arise from the use of widely disparate types of paper and films used to hold the final ink images.

In aqueous ink indirect printing, an aqueous ink is jetted on to an intermediate imaging surface, typically called a blanket, and the ink is partially dried on the blanket prior to transfixing the image to a media substrate, such as a sheet of paper. To ensure excellent print quality the ink drops jetted onto the blanket must spread and well-coalesced prior to drying, otherwise, the ink images appear grainy and have deletions. The lack of spreading can also cause missing or failed inkjets in the printheads to produce streaks in the ink image. Spreading of aqueous ink is facilitated by materials having a high energy surface. In order to facilitate transfer of the ink image from the blanket to the media substrate, however, a blanket having a surface with a relatively low surface energy is preferred. These diametrically opposed and competing properties for a blanket surface make selections of materials for blankets difficult. Reducing ink drop surface tension helps, but the spread is still generally inadequate for appropriate image quality.

One problem confronting indirect aqueous inkjet printing processes relates to the spread of ink drops during the printing process. Indirect image receiving members are formed from low surface energy materials that promote the transfer of ink from the surface of the indirect image receiving member to the print medium that receives the final printed image. Low surface energy materials, however, also tend to promote the "beading" of individual ink drops on the image receiving surface. The resulting printed image may appear to be grainy and solid lines or solid printed regions are reproduced as a series of dots instead of continuous features in the final printed image.

An optimum blanket for an indirect image transfer process must tackle three challenges: 1) wet image quality; 2) image transfer; and 3) print-head management. The first challenge—wet image quality—prefers a high surface energy density which causes the aqueous ink to spread and wet the surface, rather than beading up into discrete droplets. The second challenge—image transfer—prefers that the ink, once partially dried, has minimal attraction to the blanket surface so that 100% of the ink is transferred to the media substrate. Thus, image transfer is optimized by minimizing surface energy. The third challenge relates to how well the print head carrying the ink jets can be kept clean of dried ink. For resin-based ink, the drying of the ink on the face plate of a print head can render it inoperable. On the other hand, too much moisture can condense on the face plate and cause jetting problems. In addition, some ink jets can be sensitive to high temperatures, typically temperatures above about 70° C.

Various approaches have been investigated to provide a solution that balances all three challenges, including blanket material selection, ink design and auxiliary fluid methods. With respect to material selection, materials that are known to provide optimum release properties include the classes of silicone, fluorosilicone, TEFLON, VITON and certain hybrid materials. These compositions have low surface energy but provide poor in wetting. Alternatively, polyurethane, and polymide have been used to improve wetting but at the cost of poor ink release properties. Tuning ink compositions to address these challenges has proven to be very difficult since the primary performance attribute of the ink is the performance in the print head. For instance, if the ink surface tension is too high it will not jet properly and it if is too low it will drool out of the face plate of the print head. Compounding the problem is the fact that ink cohesion must be significantly greater than the ink-to-blanket adhesion for all image contents, including the stress cases of single layer small dot and three layer process black solid printing Thus far, the balance between the three challenges has been elusive. Most solutions have tended to err toward optimizing image transfer from the blanket to the media substrate, with some sacrifice to image quality. What is needed is a low-cost solution to this problem that optimizes both wet image quality and image transfer without compromising the ink jet print head.

SUMMARY

In one aspect, an improved coating is provided for an indirect image receiving member or blanket in an aqueous printing system in which the coatings include a hydrophilic composition and a surfactant. One improved coating composition includes a starch composition in a liquid carrier as the hydrophilic composition. In certain embodiments the starch coating composition may include a surfactant and may further include a biocide composition. The improved starch-based coating composition is applied to the surface of the blanket and at least partially dried before the aqueous ink is applied. Ink applied in an imagewise manner (i.e., according to an image transmitted to the printing device) is at least partially dried prior to reaching the transfer station where the ink image is transferred to a substrate conveyed between the blanket and a transfer roll. The surface of the blanket is then cleaned of any residual starch coating and ink (if present) and the blanket surface continues to the next application of the improved starch coating composition.

In one feature of the present disclosure, the improved coating composition acts as a barrier between the aqueous ink and the surface of the blanket to overcome high ink-blanket adhesion that otherwise interferes with ink transfer to the substrate. The improved coating compositions further ensure high image cohesion and image quality by thickening the ink-coating composite layer on the blanket surface. The improved coating composition is further adapted to weaken the adhesion to the blanket surface by absorption of water and/or co-solvent from the aqueous ink.

The starch composition is in a class of materials that can be dissolved in water and that when water is subsequently removed essentially forms a gel which cannot re-dissolve in water. Moreover, this class of materials is capable of absorbing water and expanding or swelling on the surface of the blanket. The starch-based composition is also essentially impermeable to the colorants or pigments in the aqueous ink so that the colorants will not penetrate or absorb into the starch composition layer or skin. The starch composition thus blocks the ink colorants from the underlying blanket, which essentially ensures complete transfer of the ink color to the substrate. The swelling characteristic of the starch-based composition causes a reduction in adherence of the layer or skin to the blanket so that a significant portion of the hydrophilic layer/skin is transferred with the ink to the substrate.

Once the ink has been transferred the residual starch-based hydrophilic composition on the blanket can be easily removed by application of a shear force, such as by a wiper blade or scraper. Adding water in combination with the shearing force further facilitates removal of the residual composition.

DETAILED DESCRIPTION

Figure 1:
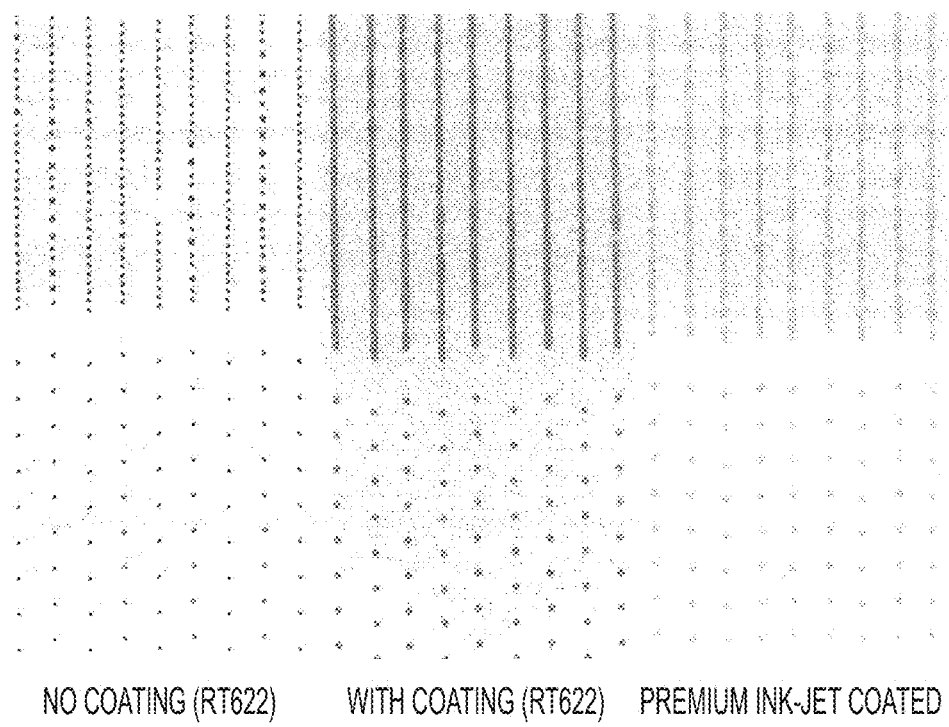
FIG. 1 is a top view of a print test comparing ink transfer onto a standard stock substrate between an untreated transfer surface and a transfer surface treated with the improved hydrophilic coating composition disclosed herein, as further compared with a conventional direct print onto a premium photo paper.

For a general understanding of the present embodiments, reference is made to the drawings. In the drawings, like reference numerals have been used throughout to designate like elements. As used herein, the terms "printer," "printing device," or "imaging device" generally refer to a device that produces an image on print media with aqueous ink and may encompass any such apparatus, such as a digital copier, bookmaking machine, facsimile machine, multi-function machine, or the like, which generates printed images for any purpose. Image data generally include information in electronic form which are rendered and used to operate the inkjet ejectors to form an ink image on the print media. These data can include text, graphics, pictures, and the like. The operation of producing images with colorants on print media, for example, graphics, text, photographs, and the like, is generally referred to herein as printing or marking. Aqueous inkjet printers use inks that have a high percentage of water relative to the amount of colorant and/or solvent in the ink.

The term "printhead" as used herein refers to a component in the printer that is configured with inkjet ejectors to eject ink drops onto an image receiving surface. A typical printhead includes a plurality of inkjet ejectors that eject ink drops of one or more ink colors onto the image receiving surface in response to firing signals that operate actuators in the inkjet ejectors. The inkjets are arranged in an array of one or more rows and columns. In some embodiments, the inkjets are arranged in staggered diagonal rows across a face of the printhead. Various printer embodiments include one or more printheads that form ink images on an image receiving surface. Some printer embodiments include a plurality of printheads arranged in a print zone. An image receiving surface, such as an intermediate imaging surface, moves past the printheads in a process direction through the print zone. The inkjets in the printheads eject ink drops in rows in a cross-process direction, which is perpendicular to the process direction across the image receiving surface. As used in this document, the term "aqueous ink" includes liquid inks in which colorant is in a solution, suspension or dispersion with a liquid solvent that includes water and/or one or more liquid solvents. The terms "liquid solvent" or more simply "solvent" are used broadly to include compounds that may dissolve colorants into a solution, or that may be a liquid that holds particles of colorant in a suspension or dispersion without dissolving the colorant.

As used herein, the term "hydrophilic" refers to any composition or compound that attracts water molecules or other solvents used in aqueous ink. As used herein, a reference to a hydrophilic composition refers to a liquid carrier that carries a hydrophilic absorption agent. Examples of liquid carriers include, but are not limited to, a liquid, such as water or alcohol, that carries a dispersion, suspension, or solution of an absorption agent. A dryer then removes at least a portion of the liquid carrier and the remaining solid or gelatinous phase absorption agent has a high surface energy to absorb a portion of the water in aqueous ink drops while enabling the colorants in the aqueous ink drops to spread over the surface of the absorption agent. As used herein, a reference to a dried layer of the absorption agent refers to an arrangement of a hydrophilic compound after all or a substantial portion of the liquid carrier has been removed from the composition through a drying process. As described in more detail below, an indirect inkjet printer forms a layer of a hydrophilic composition on a surface of an image receiving member using a liquid carrier, such as water, to apply a layer of the hydrophilic composition. The liquid carrier is used as a mechanism to convey an absorption agent in the liquid carrier to an image receiving surface to form a uniform layer of the hydrophilic composition on the image receiving surface.

As used herein, the term "absorption agent" refers to a material that is part of the hydrophilic composition, that has hydrophilic properties, and that is substantially insoluble to water and other solvents in aqueous ink during a printing process after the printer dries the absorption agent into a dried layer or "skin" that covers the image receiving surface. The printer dries the hydrophilic composition to remove all or a portion of the liquid carrier to form a dried "skin" of the absorption agent on the image receiving surface. The dried layer of the absorption agent has a high surface energy with respect to the ink drops that are ejected onto the image receiving surface. The high surface energy promotes spreading of the ink on the surface of the dried layer, and the high surface energy holds the aqueous ink in place on the moving image receiving member during the printing process.

When aqueous ink drops contact the absorption agent in the dried layer, the absorption agent absorbs a portion of the water and other solvents in the aqueous ink drop. The absorption agent in the portion of the dried layer that absorbs the water swells, but remains substantially intact during the printing operation and does not dissolve. The absorption agent in portions of the dried layer that do not contact aqueous ink has a comparatively high adhesion to the image receiving surface and a comparatively low adhesion to a print medium, such as paper. The portions of the dried layer that absorb water and solvents from the aqueous ink have a lower adhesion to the image receiving surface, and prevent colorants and other highly adhesive components in the ink from contacting the image receiving surface. Thus, the absorption agent in the dried layer promotes the spread of the ink drops to form high quality printed images, holds the aqueous ink in position during the printing process, promotes the transfer of the latent ink image from the image receiving member to paper or another print medium, and promotes the separation of the print medium from the image receiving surface after the aqueous ink image has been transferred to the print medium.

In one aspect of the present disclosure, the layer of the hydrophilic composition is formed from a starch that is dissolved in a liquid carrier such as water. The starch and liquid carrier are processed so that the resulting composition can be applied in a thin fluid film onto the image transfer surface or blanket and become a cross-linked pre-gelatinized solid film when the liquid carrier is partially/mostly removed. When dried the composition is capable of swelling by absorbing a solvent in the ink, such as water in an aqueous ink composition, but the composition itself does not dissolve in the solvent. The hydrophilic composition is applied to an image receiving surface as a liquid to enable formation of a uniform layer on the image receiving surface. The printer at least partially dries the hydrophilic composition to remove at least a portion of the liquid carrier from the hydrophilic composition to form a dried layer of solid or semi-solid absorption agent.

Pure starch is insoluble in water but become soluble when heated. Upon heating the starch granules swell and burst, the semi-crystalline structure of granules is lost and the starch molecules leach out of the granules, forming a polymer solution or a gelatin structure that holds water to thereby increase the viscosity of the composition. When water is removed quickly, the starch does not recover its semi-crystalline structure, and forms a cross-linked pre-gelatinized amorphous structure. When exposed to water again at relatively low temperature, this structure is ready to swell (absorb water) to form a gel, but will not readily dissolve to form a solution. In a preferred embodiment, the composition starts as a starch solution, being dried to form a cross-linked pre-gelatinized amorphous structure, and subsequently absorbs water/solvent from the ink to form a gel.

It is known that pure starch consists of two types of molecules: the linear and helical amylose and the branched amylopectin. For amylose, cooling or prolonged storage of the dissolved or gelatinized starch composition can lead to partial recovery of the semi-crystalline structure, causing the composition to expel carrier or water and thicken, in a process known as retrogradation and synerisis. This process can cause some quality issues for the coating and stability of the composition. For the branched amylopectin, retrogradation is much less of a concern. Therefore, it is thus preferred that the composition consist of predominantly amylopectin.

The starch coating composition is intended to be applied to the transfer surface or blanket in a uniform film having a smoothness of optical quality. The thickness of the film is desirably as thin as possible without sacrificing the integrity of the film when exposed to ink at the jetting process. The film must also be strong enough to maintain a physical barrier between the ink and a low surface energy transfer surface, even if weakened at the jetting process. Large starch molecules are suitable for the strength of this film. However, some starch molecules can swell in water with a radius of gyration greater than tens of microns, so flow coating to a few micron wet thickness is problematic. Therefore, a control of the optimal size of starch molecules is desired. Moreover, the gelatinized composition with significant amylose can create macroscopic semi-solid (gel) domains 10 microns or more in size resulting in an inhomogeneous composition. A composition with nearly pure amylopectin starch is preferred.

In certain starch coating compositions, a surfactant can be added to the starch and solvent (or water). The surfactant can be beneficial to improve the wetability of the composition on a low surface energy material, such as silicones, TEFLON and other similar compositions. The surfactant can be a silicone-based polymer composition. A biocide composition may also be added to prevent bacterial growth, reduce degradation of the composition and improve stability and shelf life of the composition.

In one specific starch coating composition, about 7.3 grams of corn starch is dispersed in about 246 grams of water and the suspension is uniformly heated at about 70° C., without boiling, to gelatinize the suspension. In certain tests the composition gelatinized in less than about 2 minutes at the 70° C. temperature. In certain tests, the starch molecules were too big and the flow property is not optimal for coating. Thus the composition is cooled to about 50° C. and then blended at high speed for a time sufficient to reduce the gelatinized starch molecules to a generally smaller and uniform size. In certain tests high speed mixing for about 1 minute yields generally smaller and uniformly sized molecules. About 0.6 g of a biocide composition, such as an antibacterial dish soap, is added, followed by about 1.2 g of a surfactant, such as Silsurf A008 surfactant. Larger quantities of the starch coating composition may be prepared while maintaining the weight ratios of the starch, water, biocide composition and surfactant. It is noted that the biocide composition may be provided to avoid bacteria growth in the starch solution, thereby maintaining a good shelf life for the composition.

It can be appreciated that in a conventional aqueous ink transfer system the drying step removes water from the ink image which increases image cohesion but is often insufficient to overcome the ink-to-blanket surface adhesion. The improved starch coating of the present system enables 100% transfer of the ink image onto the substrate by acting as a thickening agent for the ink and a release agent for the blanket or intermediate transfer surface. In particular, the starch-based composition absorbs some of the water and/or co-solvent in the aqueous ink, causing the starch coating layer to expand to maintain the physical barrier between the ink and the transfer surface. This absorption removes water from the ink thereby increasing the image cohesion prior to image transfer. This absorption weakens the starch coating composition layer but not enough to compromise the image transfer process. However, this weakening of the starch coating compositions facilitates its removal at a cleaning station by a simple wiping action, as may be accomplished by a conventional wiper blade element.

In one experiment, 1 tablespoon of corn starch was dispersed in about 1 cup of water in a pan. The suspension was uniformly heated while continuously stirring. The suspension began to thicken when the suspension reached about 70° C. Stirring and heating continued for about another 2 minute, without boiling. The thickened composition was cooled to about 50° C. then was blended at high speed for about 1 minute. About ⅛ teaspoon of DAWN antibacterial soap concentrate was added to the blended solution, followed by about 1.2 g of Silsurf A008 surfactant (0.5%).

The starch coating composition was then applied to a flat silicone transfer surface (RT622) using an Anilox roller and then dried to form a film of about 0.1 micron thick. Coating, drying, ink jetting and transfer was tested at about 21 cm/sec. The ink jetting was at 600 dpi with a drop volume of about 5 pl. The ink is then partially dried to a semi-wet, tacky state and contact transferred to paper. As shown in FIG. 1, the ink transfer on the surface treated with the improved starch coating was significantly better than the ink transfer without the coating. Moreover, the improved starch coating produced an ink transfer that was as good or better than a conventional ink transfer on premium coated photo paper. In particular, the wetting is better as evidenced by the connected lines. In addition, although not apparent from FIG. 1, the color was stronger for the improved coating transfer.

Figure 2:
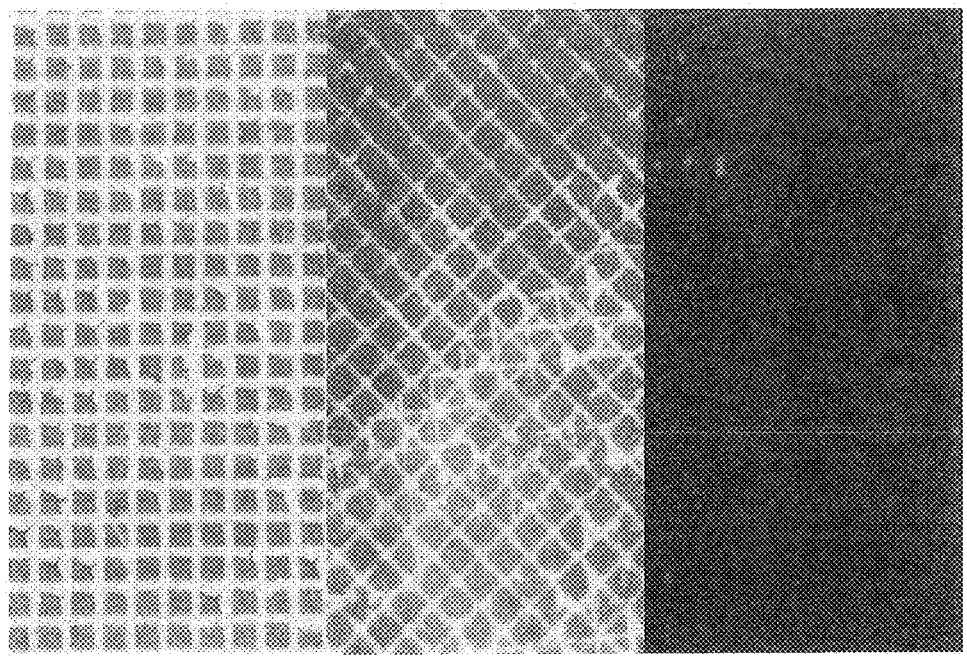
FIG. 2 is a top view of a print test for a multilayer transfer process showing one, two and three layer test strips printed using the improved hydrophilic coating composition disclosed herein.

Another test involved a multilayer transfer on a transfer plate (RT622) heated to about 50° C. The starch coating was first applied, followed by ink transfers for magenta, yellow and cyan, after which the ink was transferred to a conventional substrate. The results of the test shown in FIG. 2 demonstrate that the improved coating was capable of a single layer (magenta, yellow, cyan) transfer, a double layer transfer producing a red segment (the upper portion of the middle strip) and a three layer transfer yielding a black sample.

Several starchy materials have been tested, including corn starch, potato starch, rice starch, wheat flour, rice flour and corn flour. All of the starches worked in the aqueous ink jet environment, although some starches required a thicker coating while other starches required more involved preparation. It was found that corn starch provided good results and was relatively easy to prepare. In addition, waxy starches such as waxy corn starch, waxy potato starch, glutinous rice starch and etc. are known to have nearly pure amylopectin. These starches produced the best results.

It has been found that the starch coating overcomes the wet image quality problem discussed above by providing an ink jet-required wetting surface. In addition, the improved starch coating provides partial water/co-solvent absorption which can be desirable for aqueous ink jet applications. This coating improves the image cohesion significantly to enable excellent transfer of image, including hot-melt transfer at high temperature, or sticky (semi-wet) transfer at room/warm temperatures. The starch coating reduces the total water/solvent evaporation required for the process, which enables a lower (warm, 50~60 C) temperature for the blanket at the imaging point. In addition to the advantages with respect to the three challenges discussed above, the improved coating disclosed herein enables simple, low-waste, low-wear and high speed cleaning/refreshing of the transfer surface, which manifests in no ghosting effect and long transfer surface life.

The disclosed starch coating can further improve paper stripping. Many materials with good releasing properties such as silicones, graft silicone are very tacky. Stripping is a big challenge for cut-sheet paper handling. The starch coating stays on top of the image (on paper) and serves as an overcoat protection layer. Finally, it is believed that the starch coating disclosed herein is a very low-cost solution to the problems noted above, costing as little as a few cents per Kp.

Figure 3:
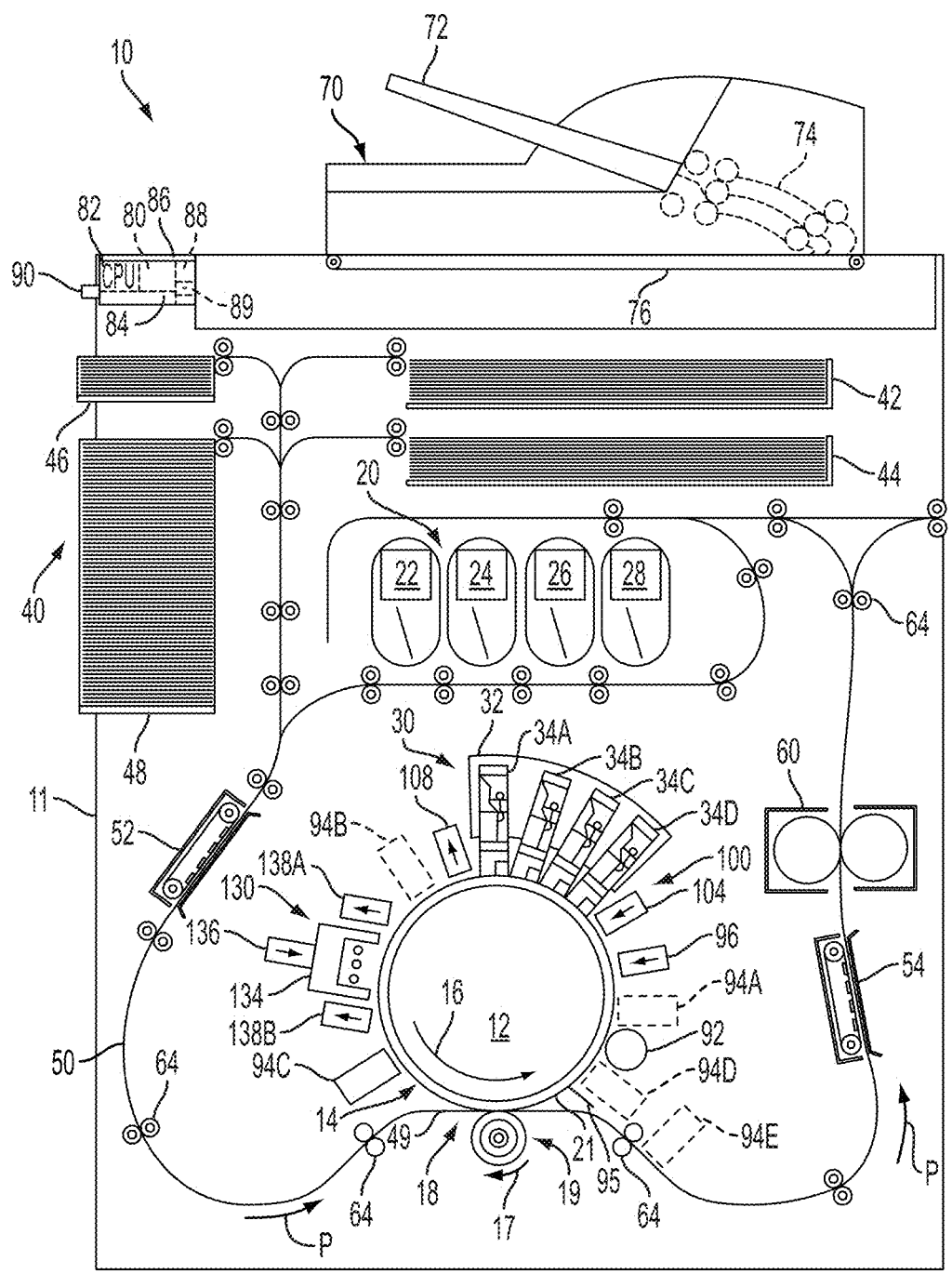
FIG. 3 is a schematic drawing of an aqueous indirect inkjet printer that prints sheet media.

FIG. 3 illustrates a high-speed aqueous ink image producing machine or printer 10. As illustrated, the printer 10 is an indirect printer that forms an ink image on a surface of a blanket 21 mounted about an intermediate rotating member 12 and then transfers the ink image to media passing through a nip 18 formed between the blanket 21 and the transfix roller 19. The surface 14 of the blanket 21 is referred to as the image receiving surface of the blanket 21 and the rotating member 12 since the surface 14 receives a hydrophilic composition and the aqueous ink images that are transfixed to print media during a printing process. A print cycle is now described with reference to the printer 10. As used in this document, "print cycle" refers to the operations of a printer to prepare an imaging surface for printing, ejection of the ink onto the prepared surface, treatment of the ink on the imaging surface to stabilize and prepare the image for transfer to media, and transfer of the image from the imaging surface to the media.

The printer 10 includes a frame 11 that supports directly or indirectly operating subsystems and components, which are described below. The printer 10 includes an indirect image receiving member, which is illustrated as rotating imaging drum 12 in FIG. 3, but can also be configured as a supported endless belt. The imaging drum 12 has an outer blanket 21 mounted about the circumference of the drum 12. The blanket moves in a direction 16 as the member 12 rotates. A transfix roller 19 rotatable in the direction 17 is loaded against the surface of blanket 21 to form a transfix nip 18, within which ink images formed on the surface of blanket 21 are transfixed onto a media sheet 49. In some embodiments, a heater in the drum 12 (not shown) or in another location of the printer heats the image receiving surface 14 on the blanket 21 to a temperature in a range of approximately of 50° C. to 70° C. The elevated temperature promotes partial drying of the liquid carrier that is used to deposit the hydrophilic composition and of the water in the aqueous ink drops that are deposited on the image receiving surface 14.

The blanket is formed of a material having a relatively low surface energy to facilitate transfer of the ink image from the surface of the blanket 21 to the media sheet 49 in the nip 18. Such materials include silicones, fluoro-silicones, Viton, and the like. A surface maintenance unit (SMU) 92 removes residual ink left on the surface of the blanket 21 after the ink images are transferred to the media sheet 49. The low energy surface of the blanket does not aid in the formation of good quality ink images because such surfaces do not spread ink drops as well as high energy surfaces. Consequently, the SMU 92 also applies a coating of a hydrophilic composition to the newly cleaned image receiving surface 14 on the blanket 21. The hydrophilic composition aids in spreading aqueous ink drops on the image receiving surface and aiding in the release of the ink image from the blanket. Examples of hydrophilic compositions include surfactants, starches, and the like.

Figure 4:
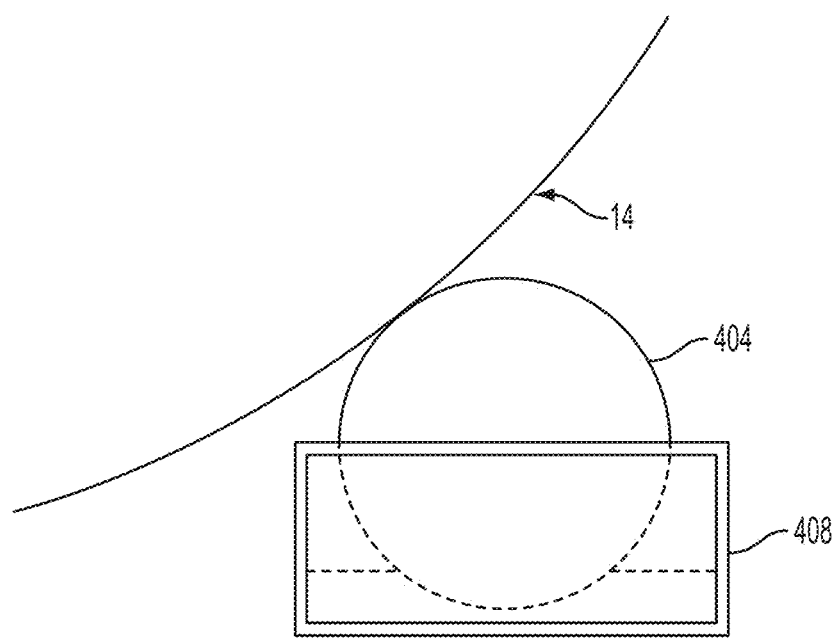
FIG. 4 is a schematic drawing of a surface maintenance unit that applies a hydrophilic composition to a surface of an indirect image receiving member in an inkjet printer.

In one embodiment that is depicted in FIG. 4, the SMU 92 includes a coating applicator, such as a donor roller 404, which is partially submerged in a reservoir 408 that holds a hydrophilic composition in a liquid carrier. The donor roller 404 rotates in response to the movement of the image receiving surface 14 in the process direction. The donor roller 404 draws the liquid hydrophilic composition from the reservoir 408 and deposits a layer of the hydrophilic composition on the image receiving surface 14. As described below, the hydrophilic composition is deposited as a uniform layer with a thickness of approximately 1 μm to 10 μm. The SMU 92 deposits the hydrophilic composition on the image receiving surface 14 to form a uniform distribution of the absorption agent in the liquid carrier of the hydrophilic composition. After a drying process, the dried layer forms a "skin" of the absorption agent that substantially covers the image receiving surface 14 before the printer ejects ink drops during a print process. In some illustrative embodiments, the donor roller 404 is an anilox roller or an elastomeric roller made of a material, such as rubber. The SMU 92 is operatively connected to a controller 80, described in more detail below, to enable the controller to operate the donor roller, as well as a metering blade and a cleaning blade, selectively to deposit and distribute the coating material onto the surface of the blanket and to remove un-transferred ink and skin from the surface of the blanket 21.

The printer 10 includes a dryer 96 that emits heat and optionally directs an air flow toward the hydrophilic composition that is applied to the image receiving surface 14. The dryer 96 facilitates the evaporation of at least a portion of the liquid carrier from the hydrophilic composition to leave a dried layer of absorption agent on the image receiving surface 14 before the image receiving member passes the printhead modules 34A-34D to receive the aqueous printed image.

The printer 10 include an optical sensor 94A, also known as an image-on-drum ("IOD") sensor, which is configured to detect light reflected from the blanket surface 14 and the coating applied to the blanket surface as the member 12 rotates past the sensor. The optical sensor 94A includes a linear array of individual optical detectors that are arranged in the cross-process direction across the blanket 21. The optical sensor 94A generates digital image data corresponding to light that is reflected from the blanket surface 14 and the coating. The optical sensor 94A generates a series of rows of image data, which are referred to as "scanlines," as the image receiving member 12 rotates the blanket 21 in the direction 16 past the optical sensor 94A. In one embodiment, each optical detector in the optical sensor 94A further comprises three sensing elements that are sensitive to wavelengths of light corresponding to red, green, and blue (RGB) reflected light colors. Alternatively, the optical sensor 94A includes illumination sources that shine red, green, and blue light or, in another embodiment, the sensor 94A has an illumination source that shines white light onto the surface of blanket 21 and white light detectors are used. The optical sensor 94A shines complementary colors of light onto the image receiving surface to enable detection of different ink colors using the photodetectors. The image data generated by the optical sensor 94A is analyzed by the controller 80 or other processor in the printer 10 to identify the thickness of the coating on the blanket and the area coverage. The thickness and coverage can be identified from either specular or diffuse light reflection from the blanket surface and/or coating. Other optical sensors, such as 94B, 94C, and 94D, are similarly configured and can be located in different locations around the blanket 21 to identify and evaluate other parameters in the printing process, such as missing or inoperative inkjets and ink image formation prior to image drying (94B), ink image treatment for image transfer (94C), and the efficiency of the ink image transfer (94D). Alternatively, some embodiments can include an optical sensor to generate additional data that can be used for evaluation of the image quality on the media (94E).

The printer 10 includes an airflow management system 100, which generates and controls a flow of air through the print zone. The airflow management system 100 includes a printhead air supply 104 and a printhead air return 108. The printhead air supply 104 and return 108 are operatively connected to the controller 80 or some other processor in the printer 10 to enable the controller to manage the air flowing through the print zone. This regulation of the air flow can be through the print zone as a whole or about one or more printhead arrays. The regulation of the air flow helps prevent evaporated solvents and water in the ink from condensing on the printhead and helps attenuate heat in the print zone to reduce the likelihood that ink dries in the inkjets, which can clog the inkjets. The airflow management system 100 can also include sensors to detect humidity and temperature in the print zone to enable more precise control of the temperature, flow, and humidity of the air supply 104 and return 108 to ensure optimum conditions within the print zone. Controller 80 or some other processor in the printer 10 can also enable control of the system 100 with reference to ink coverage in an image area or even to time the operation of the system 100 so air only flows through the print zone when an image is not being printed.

The high-speed aqueous ink printer 10 also includes an aqueous ink supply and delivery subsystem 20 that has at least one source 22 of one color of aqueous ink. Since the illustrated printer 10 is a multicolor image producing machine, the ink delivery system 20 includes four (4) sources 22, 24, 26, 28, representing four (4) different colors CYMK (cyan, yellow, magenta, black) of aqueous inks. In the embodiment of FIG. 3, the printhead system 30 includes a printhead support 32, which provides support for a plurality of printhead modules, also known as print box units, 34A through 34D. Each printhead module 34A-34D effectively extends across the width of the blanket and ejects ink drops onto the surface 14 of the blanket 21. A printhead module can include a single printhead or a plurality of printheads configured in a staggered arrangement. Each printhead module is operatively connected to a frame (not shown) and aligned to eject the ink drops to form an ink image on the coating on the blanket surface 14. The printhead modules 34A-34D can include associated electronics, ink reservoirs, and ink conduits to supply ink to the one or more printheads. In the illustrated embodiment, conduits (not shown) operatively connect the sources 22, 24, 26, and 28 to the printhead modules 34A-34D to provide a supply of ink to the one or more printheads in the modules. As is generally familiar, each of the one or more printheads in a printhead module can eject a single color of ink. In other embodiments, the printheads can be configured to eject two or more colors of ink. For example, printheads in modules 34A and 34B can eject cyan and magenta ink, while printheads in modules 34C and 34D can eject yellow and black ink. The printheads in the illustrated modules are arranged in two arrays that are offset, or staggered, with respect to one another to increase the resolution of each color separation printed by a module. Such an arrangement enables printing at twice the resolution of a printing system only having a single array of printheads that eject only one color of ink. Although the printer 10 includes four printhead modules 34A-34D, each of which has two arrays of printheads, alternative configurations include a different number of printhead modules or arrays within a module.

After the printed image on the blanket surface 14 exits the print zone, the image passes under an image dryer 130. The image dryer 130 includes a heater, such as a radiant infrared, radiant near infrared and/or a forced hot air convection heater 134, a dryer 136, which is illustrated as a heated air source 136, and air returns 138A and 138B. The infrared heater 134 applies infrared heat to the printed image on the surface 14 of the blanket 21 to evaporate water or solvent in the ink. The heated air source 136 directs heated air over the ink to supplement the evaporation of the water or solvent from the ink. In one embodiment, the dryer 136 is a heated air source with the same design as the dryer 96. While the dryer 96 is positioned along the process direction to dry the hydrophilic composition, the dryer 136 is positioned along the process direction after the printhead modules 34A-34D to at least partially dry the aqueous ink on the image receiving surface 14. The air is then collected and evacuated by air returns 138A and 138B to reduce the interference of the air flow with other components in the printing area.

As further shown, the printer 10 includes a recording media supply and handling system 40 that stores, for example, one or more stacks of paper media sheets of various sizes. The recording media supply and handling system 40, for example, includes sheet or substrate supply sources 42, 44, 46, and 48. In the embodiment of printer 10, the supply source 48 is a high capacity paper supply or feeder for storing and supplying image receiving substrates in the form of cut media sheets 49, for example. The recording media supply and handling system 40 also includes a substrate handling and transport system 50 that has a media pre-conditioner assembly 52 and a media post-conditioner assembly 54. The printer 10 includes an optional fusing device 60 to apply additional heat and pressure to the print medium after the print medium passes through the transfix nip 18. In the embodiment of FIG. 3, the printer 10 includes an original document feeder 70 that has a document holding tray 72, document sheet feeding and retrieval devices 74, and a document exposure and scanning system 76.

Operation and control of the various subsystems, components and functions of the machine or printer 10 are performed with the aid of a controller or electronic subsystem (ESS) 80. The ESS or controller 80 is operably connected to the image receiving member 12, the printhead modules 34A-34D (and thus the printheads), the substrate supply and handling system 40, the substrate handling and transport system 50, and, in some embodiments, the one or more optical sensors 94A-94E. The ESS or controller 80, for example, is a self-contained, dedicated mini-computer having a central processor unit (CPU) 82 with electronic storage 84, and a display or user interface (UI) 86. The ESS or controller 80, for example, includes a sensor input and control circuit 88 as well as a pixel placement and control circuit 89. In addition, the CPU 82 reads, captures, prepares and manages the image data flow between image input sources, such as the scanning system 76, or an online or a work station connection 90, and the printhead modules 34A-34D. As such, the ESS or controller 80 is the main multi-tasking processor for operating and controlling all of the other machine subsystems and functions, including the printing process discussed below.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

Although the printer 10 in FIG. 3 is described as having a blanket 21 mounted about an intermediate rotating member 12, other configurations of an image receiving surface can be used. For example, the intermediate rotating member can have a surface integrated into its circumference that enables an aqueous ink image to be formed on the surface. Alternatively, a blanket is configured as an endless rotating belt for formation of an aqueous image. Other variations of these structures can be configured for this purpose. As used in this document, the term "intermediate imaging surface" includes these various configurations.

Once an image or images have been formed on the blanket and coating under control of the controller 80, the illustrated inkjet printer 10 operates components within the printer to perform a process for transferring and fixing the image or images from the blanket surface 14 to media. In the printer 10, the controller 80 operates actuators to drive one or more of the rollers 64 in the media transport system 50 to move the media sheet 49 in the process direction P to a position adjacent the transfix roller 19 and then through the transfix nip 18 between the transfix roller 19 and the blanket 21. The transfix roller 19 applies pressure against the back side of the recording media 49 in order to press the front side of the recording media 49 against the blanket 21 and the image receiving member 12. Although the transfix roller 19 can also be heated, in the exemplary embodiment of FIG. 3, the transfix roller 19 is unheated. Instead, the pre-heater assembly 52 for the media sheet 49 is provided in the media path leading to the nip. The pre-conditioner assembly 52 conditions the media sheet 49 to a predetermined temperature that aids in the transferring of the image to the media, thus simplifying the design of the transfix roller. The pressure produced by the transfix roller 19 on the back side of the heated media sheet 49 facilitates the transfixing (transfer and fusing) of the image from the image receiving member 12 onto the media sheet 49. The rotation or rolling of both the image receiving member 12 and transfix roller 19 not only transfixes the images onto the media sheet 49, but also assists in transporting the media sheet 49 through the nip. The image receiving member 12 continues to rotate to enable the printing process to be repeated.

After the image receiving member moves through the transfix nip 18, the image receiving surface passes a cleaning unit that removes residual portions of the absorption agent and small amounts of residual ink from the image receiving surface 14. In the printer 10, the cleaning unit is embodied as a cleaning blade 95 that engages the image receiving surface 14. The blade 95 is formed from a material that wipes the image receiving surface 14 without causing damage to the blanket 21. For example, the cleaning blade 95 is formed from a flexible polymer material in the printer 10. As depicted below in FIG. 3, another embodiment has a cleaning unit that includes a roller or other member that applies a mixture of water and detergent to remove residual materials from the image receiving surface 14 after the image receiving member moves through the transfix nip 18. As used herein, the term "detergent" or cleaning agent refers to any surfactant, solvent, or other chemical compound that is suitable for removing the dried portion of the absorption agent and any residual ink that may remain on the image receiving surface from the image receiving surface. One example of a suitable detergent is sodium stearate, which is a compound commonly used in soap. Another example is IPA, which is common solvent that is very effective to remove ink residues from the image receiving surface.

Figure 5:
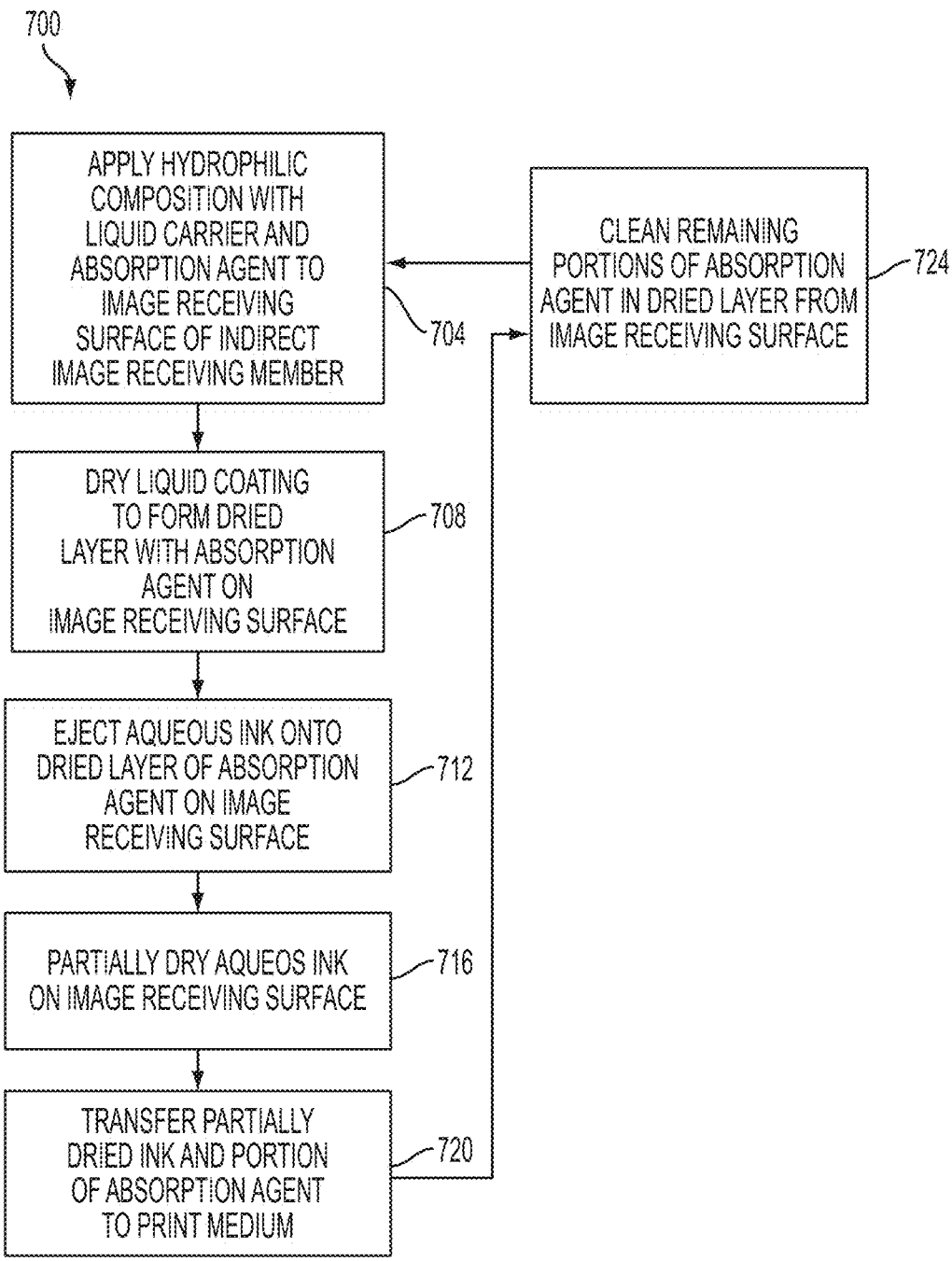
FIG. 5 is a block diagram of a process for printed images in an indirect inkjet printer that uses aqueous inks.

FIG. 5 depicts a process 700 for operating an aqueous indirect inkjet printer using a hydrophilic composition to form a dried coating or "skin" layer of a dried absorption agent in the hydrophilic composition on an image receiving surface of an indirect image receiving member prior to ejecting liquid ink drops onto the dried layer. In the discussion below, a reference to the process 700 performing an action or function refers to a controller, such as the controller 80 in the printer 10, executing stored programmed instructions to perform the action or function in conjunction with other components of the printer. The process 700 is described in conjunction with FIG. 1 showing the printer 10, and FIG. 6A-FIG. 6E showing the blanket and coatings, for illustrative purposes.

Process 700 begins as the printer applies a layer of a hydrophilic composition with a liquid carrier to the image receiving surface of the image receiving member (block 704). In the printer 10, the drum 12 and blanket 21 move in the process direction along the indicated circular direction 16 during the process 700 to receive the hydrophilic composition. In the printer 10, the SMU 92 applies a hydrophilic composition with a liquid carrier to the surface 14 of the imaging drum 12.

Figure 6A:
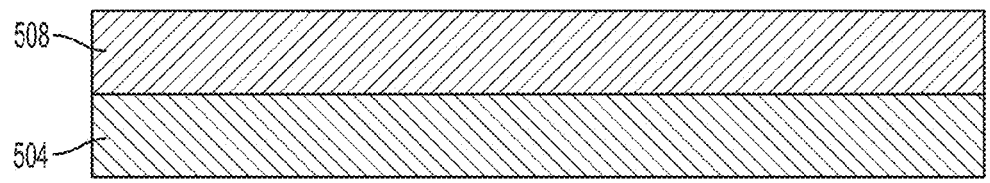
FIG. 6A is a side view of a hydrophilic composition that is formed on the surface of an indirect image receiving member in an inkjet printer.

In one embodiment, the liquid carrier is water or another liquid, such as alcohol, which partially evaporates from the image receiving surface and leaves a dried layer of absorption agent on the image receiving surface. In FIG. 6A, the surface of the indirect image receiving member 504 is covered with the hydrophilic composition 508. The SMU 92 deposits the hydrophilic composition on the image receiving surface 14 of the blanket 21 to form a uniform coating of the hydrophilic composition. A greater coating thickness of the hydrophilic composition enables formation of a uniform layer that completely covers the image receiving surface, but the increased volume of liquid carrier in the thicker coating requires additional drying time or larger dryers to remove the liquid carrier to form a dried layer of the absorption agent. Thinner coatings of the hydrophilic composition require the removal of a smaller volume of the liquid carrier to form the dried layer, but if the coating of hydrophilic composition is too thin, then the coating may not fully cover the image receiving surface. In certain embodiments the hydrophilic composition with the liquid carrier is applied at a thickness of between approximately 1 μm and 10 μm.

Figure 6B:
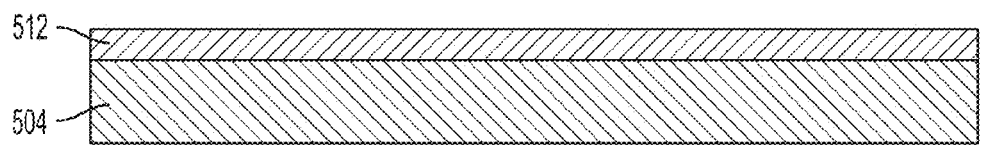
FIG. 6B is a side view of dried hydrophilic composition on the surface of the indirect image receiving member after a dryer removes a portion of a liquid carrier in the hydrophilic composition.

Process 700 continues as a dryer in the printer dries the hydrophilic composition to remove at least a portion of the liquid carrier and to form a dried layer of the absorption agent on the image receiving surface (block 708). In the printer 10 the dryer 96 applies radiant heat and optionally includes a fan to circulate air onto the image receiving surface of the drum 12 or belt 13. FIG. 6B depicts the dried layer of the absorption agent 512. The dryer 96 removes a portion of the liquid carrier, which decreases the thickness of the layer of dried layer that is formed on the image receiving surface. In the printer 10 the thickness of the dried layer 512 is on the range of 0.1 μm to 3 μm in different embodiments, and in certain specific embodiments between 0.1 to 0.5 μm.

The dried layer of the absorption agent 512 is also referred to as a "skin" layer. The dried layer 512 has a uniform thickness that covers substantially all of the portion of the image receiving surface that receives aqueous ink during a printing process. As described above, while the hydrophilic composition with the liquid carrier includes solutions, suspension, or dispersion of the hydrophilic material in a liquid carrier, the dried layer of the absorption agent 512 forms a continuous matrix that covers the image receiving surface 504. The dried layer 512 has a comparatively high level of adhesion to the image receiving surface 504, and a comparatively low level of adhesion to a print medium that contacts the dried layer 512. As described in more detail below, when aqueous ink drops are ejected onto portions of the dried layer 512, a portion of the water and other solvents in the aqueous ink permeates the dried layer 512. The portion of the dried layer 512 that absorbs the liquid swells, but remains substantially intact on the image receiving surface 504.

Process 700 continues as the image receiving surface with the hydrophilic skin layer moves past one or more printheads that eject aqueous ink drops onto the dried layer and the image receiving surface to form a latent aqueous printed image (block 712). The printhead modules 34A-34D in the printer 10 eject ink drops in the CMYK colors to form the printed image. When the water in the aqueous ink contacts the dried layer of the absorption agent that is formed on the image receiving surface, the dried layer rapidly absorbs the liquid water. Thus, each ink drop of the aqueous ink that is ejected into the image receiving surface expands as the absorption agent in the dried layer absorbs a portion of the water in the liquid ink drop. The absorption of water into the dried layer 512 also promotes binding between the aqueous ink and the absorption agent in the dried layer to "pin" or hold the liquid ink in a single location on the image receiving surface 504.

Figure 6C:
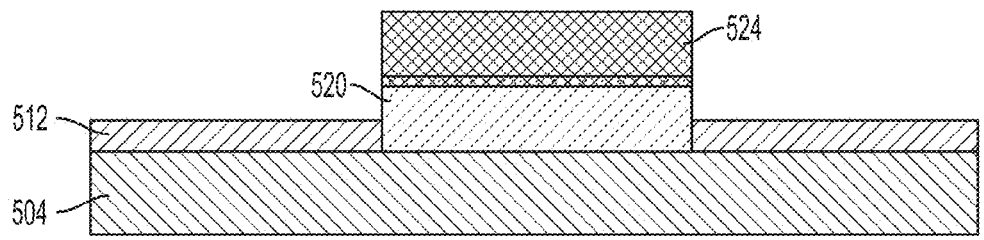
FIG. 6C is a side view of a portion of an aqueous ink image that is formed on the dried hydrophilic composition on the surface of the indirect image receiving member.

As depicted in FIG. 6C, the portion of the dried layer 512 that receives aqueous ink 524 absorbs water from the aqueous ink and swells, as is depicted by the region 520. The absorption agent in the region 520 absorbs water and other solvents in the ink and the absorption agent swells in response to absorption of the water and solvent. The aqueous ink 524 includes colorants such as pigments, resins, polymers, and the like. The absorption agent 512 is substantially impermeable to the colorants in the ink 524, and the colorants remain on the surface of the dried layer 512 where the aqueous ink spreads. Since the dried layer 512 is typically less than 1 μm in thickness, the absorption agent in the dried layer 520 absorbs only a portion of the water from the aqueous ink 524, while the ink 524 retains a majority of the water.

The spread of the liquid ink enables neighboring aqueous ink drops to merge together on the image receiving surface instead of beading into individual droplets as occurs in traditional low-surface energy image receiving surfaces. In the example shown in FIG. 1 the ink drops that are formed on a bare image receiving surface with low-surface energy and no coating, and then are transferred to ordinary paper exhibit beading of the ink drops in which the drops remain in the form of individual droplets instead of merging together. When the printed ink drops that are jetted directly to a high-quality paper that is specifically coated for inkjet printing the ink drops spread to a greater degree, but the paper absorbs a large proportion of the colorant in the ink quickly, which reduces the perceptible density of the ink. The quick and complete absorption of the ink drops into the premium paper limits the amount of spreading of the ink drops, resulting in a printed pattern that still includes non-continuous lines. However, the middle printed pattern is formed using the hydrophilic composition described above. As depicted in FIG. 1, the ink drops spread because the absorption agent has a high surface energy that promotes spreading of the ink drops on the image receiving member. Furthermore, slow absorption of the water/solvent by the skin and the limited water absorption capacity of the skin give the ink more time to spread. Thus, the dried layer enables printing of solid lines and patterns as depicted in FIG. 1 using less ink than is required with prior art printers.

Figure 6D:
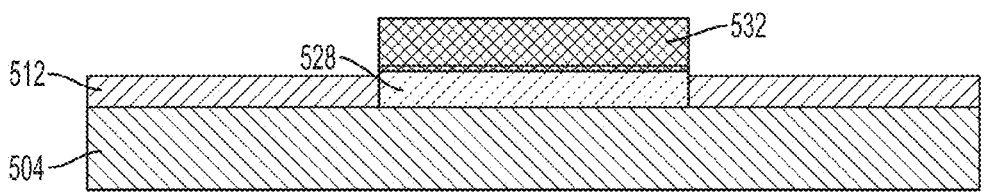
FIG. 6D is a side view of a portion of the aqueous ink image that is formed on the dried hydrophilic composition after a dryer in the printer removes a portion of the water in the aqueous ink.

Referring again to FIG. 5, the process 700 continues with a partial drying process of the aqueous ink on the image receiving member (block 716). The drying process removes a portion of the water from the aqueous ink and the hydrophilic skin layer on the image receiving surface so that the amount of water that is transferred to a print medium in the printer does not produce cockling or other deformations of the print medium. In the printer 10, the heated air source 136 directs heated air toward the image receiving surface 14 to dry the printed aqueous ink image. In some embodiments, the image receiving member and blanket are heated to an elevated temperature to promote evaporation of liquid from the ink and the dried layer of the absorption agent. For example, in the printer 10, the imaging drum 12 and blanket 21 are heated to a temperature of 50° C. to 70° C. to enable partial drying of the ink and absorption agent in the dried layer during the printing process. As depicted in FIG. 6D, the drying process forms a partially dried layer 528 and aqueous ink 532 that both retain a reduced amount of water compared to the freshly printed aqueous ink image of FIG. 6C.

The drying process increases the viscosity of the aqueous ink, which changes the consistency of the aqueous ink from a low-viscosity liquid to a higher viscosity tacky material. In some embodiments, the absorption agent that absorbs a portion of the water in the aqueous ink also acts as a thickening agent that increases the viscosity of the aqueous ink. The drying process also reduces the thickness of the ink 532 and the portion of the absorption agent 528 that absorbed water from the ink 532. One common failure mode for transfer of aqueous ink images to print media occurs when the aqueous ink image splits. That is to say, only about half of the ink transfers to the print medium from the indirect image receiving surface, while the remaining portion of the ink image remains on the indirect image receiving member. The failure of ink transfer is typically caused by the low cohesion of ink image layer, because the ink layer has the weakest separation force at the exit of the transfer nip when two image receiving surface and the substrate surface are separating. To increase the efficiency of ink transfer, the cohesion of the ink layer or ink/skin composite layer should be significantly greater than the adhesion between the skin and the blanket surface. As is known in the art, the cohesion of the ink is proportional to the viscosity of the ink and inversely proportional to the thickness of the ink. Thus, the drying process greatly increases the cohesiveness of the aqueous ink. The materials in the ink 532 with the highest degree of cohesiveness include resins or polymers that do not permeate into the underlying absorption agent 528. The underlying layer of the absorption agent 528 separates the partially dried ink 532 from the image receiving surface 504, and the water content in the absorption agent 528 reduces the adhesion between the absorption agent 528 and the image receiving surface 504. Thus, the partially dried ink 532 and absorption agent 528 enable efficient transfer of the printed ink from the image receiving surface 504 to a print medium.

Figure 6E:
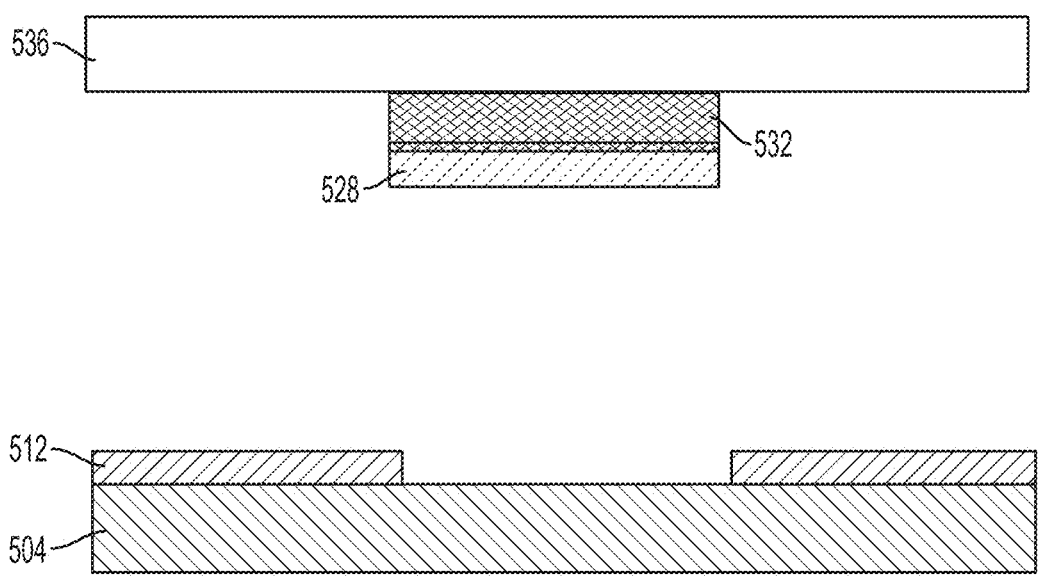
FIG. 6E is a side view of a print medium that receives the aqueous ink image and a portion of the dried layer of the hydrophilic composition after a transfix operation in the inkjet printer.

Process 700 continues as the printer transfixes the latent aqueous ink image from the image receiving surface to a print medium, such as a sheet of paper (block 720). In the printer 10, the image receiving surface 14 of the drum 12 engages the transfix roller 19 to form a nip 18. A print medium, such as a sheet of paper, moves through the nip between the drum 12 and the transfix roller 19. The pressure in the nip transfers the latent aqueous ink image and a portion of the dried layer to the print medium. After passing through the transfix nip 18, the print medium carries the printed aqueous ink image. As depicted in FIG. 6E, a print medium 536 carries a printed aqueous ink image 532 with the absorption agent 528 covering the ink image 532 on the surface of the print medium 536. The absorption agent 528 provides protection to the aqueous ink image from scratches or other physical damage while the aqueous ink image 532 dries on the print medium 536.

As depicted in FIG. 6E, the aqueous ink and portions of the dried layer that absorb ink separate from the image receiving surface 504 in the transfix nip since the image receiving surface 504 has a low level of adhesion to the absorption agent 528 that is formed under the printed ink image 532. The dry portions of the absorption agent in the dried layer 512 have minimal adhesion to the print medium 536, which promotes the separation of the print medium 536 from the image receiving surface 504 after completion of the transfix process. By contrast, prior art release agents, such as silicone oil, promote the release of ink from an image receiving surface, but also form an adhesive layer between the image receiving member and the print medium, which presents difficulty in separating the print medium from the image receiving member after the transfix operation. As depicted in FIG. 6E, the dry portions of the absorption agent in the dried layer 512 typically remains on the image receiving surface 504 after completion of the transfix operation because the absorption agent has a low level of adhesion to the print medium.

During process 700, the printer cleans residual portions of the absorption agent in the dried layer from the image receiving surface after the transfixing operation (block 724). In one embodiment, a fluid cleaning system 395 uses, for example, a combination of water and a detergent with mechanical agitation on the image receiving surface to remove the residual portions of the absorption agent from the surface of the belt 13. The fluid cleaning system 395 uses, for example, a combination of water and a detergent to remove the residual portions of the absorption agent from the surface of the belt 13. In the printer 10, a cleaning blade 95, which can be used in conjunction with water, engages the blanket 21 to remove the residual absorption agent from the image receiving surface 14. The cleaning blade 95 is, for example, a polymer blade that wipes residual portions of the absorption agent from the blanket 21.

During a printing operation, process 700 returns to the processing described above with reference to block 704 to apply the hydrophilic composition to the image receiving surface, print additional aqueous ink images, and transfix the aqueous ink images to print media for additional printed pages in the print process. The illustrative embodiment of the printer 10 operates in a "single pass" mode that forms the dried layer, prints the aqueous ink image and transfixes the aqueous ink image to a print medium in a single rotation or circuit of the indirect image receiving member. In alternative embodiments, an inkjet employs a multi-pass configuration where the image receiving surface completes two or more rotations or circuits to form the dried layer and receive the aqueous ink image prior to transfixing the printed image to the print medium.

In some embodiments of the process 700, the printer forms printed images using a single layer of ink such as the ink that is depicted in FIG. 6C. In the printer 10, however, the multiple printhead modules enable the printer to form printed images with multiple colors of ink. In other embodiments of the process 700, the printer forms images using multiple ink colors. In some regions of the printed image, multiple colors of ink may overlap in the same area on the image receiving surface, forming multiple ink layers on the hydrophilic composition layer. The method steps in FIG. 5 can be applied to the multiple ink layer circumstance with the same results, as demonstrated by the multiple layer test strips shown in FIG. 2.

It will be appreciated that variations of the above-disclosed apparatus and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A coating composition for an image transfer member in an aqueous ink imaging system in which the aqueous ink includes a colorant in a liquid solvent, comprising:
   a hydrophilic composition including an absorption agent in a liquid carrier, the absorption agent adapted to absorb the solvent in the aqueous ink and to be substantially impermeable to the colorant in the aqueous ink when the hydrophilic composition is dried; and
   a surfactant.

2. The coating composition of claim 1, wherein the absorption agent is adapted to swell in response to absorption of the liquid solvent from the aqueous ink.

3. The coating composition of claim 1, wherein the liquid carrier is water.

4. The coating composition of claim 1, wherein the absorption agent includes a starch.

5. The coating composition of claim 4, wherein the starch includes a starch selected from the group including corn starch, potato starch, rice starch, wheat flour, rice flour and corn flour.

6. The coating composition of claim 4, wherein the starch is a starch consisting of predominantly amylopectin.

7. The coating composition of claim 4, wherein the starch is a waxy starch.

8. The coating composition of claim 7, wherein the starch includes a starch selected from the group including waxy corn starch, waxy potato starch, and glutinous rice starch.

9. The coating composition of claim 1, further comprising a biocide composition.

10. The coating composition of claim 1, wherein the surfactant is a silicone-based polymer composition.

11. An aqueous ink transfer process comprising:
    coating the surface of an image transfer member (ITM) with a coating composition to a first thickness, the coating composition including a hydrophilic composition and a surfactant, wherein the hydrophilic composition includes an absorption agent in a liquid carrier, the absorption agent adapted to absorb the solvent in the aqueous ink;
    partially drying the coating composition to a reduced second thickness;
    applying aqueous ink onto the coating composition in which the aqueous ink includes a colorant in a liquid solvent;
    swelling the coating composition by absorbing water from the ink;
    partially drying the ink; and
    transferring the ink onto a substrate.

12. The aqueous ink transfer process of claim 11, wherein the first thickness is between 1 µm and 10 µm.

13. The aqueous ink transfer process of claim 12 wherein the second thickness of between 0.1 µm and 1 µm.

14. The aqueous ink transfer process of claim 11, wherein the surface of the ITM has a low surface energy.

15. The aqueous ink transfer process of claim 11, wherein the step of applying aqueous ink includes applying the ink in an imagewise manner.

16. The aqueous ink transfer process of claim 11, wherein the absorption agent includes a starch.

17. The aqueous ink transfer process of claim 16, wherein the starch is a starch consisting of predominantly amylopectin.

18. The aqueous ink transfer process of claim 16, wherein the starch includes a starch selected from the group including corn starch, potato starch, rice starch, wheat flour, rice flour and corn flour.

19. An aqueous ink transfer process comprising:
    coating the surface of an image transfer member (ITM) with a coating composition, the coating composition including a hydrophilic composition and a surfactant, wherein the hydrophilic composition includes an absorption agent in a liquid carrier, the absorption agent adapted to absorb the solvent in the aqueous ink;
    applying aqueous ink onto the coating composition in which the aqueous ink includes a colorant in a liquid solvent;
    after applying the ink, reducing the adherence of the coating composition to the surface of the ITM;
    partially drying the ink; and
    transferring the ink onto a substrate.

20. The aqueous ink transfer process of claim 19, wherein the surface of the ITM has a low surface energy.

\* \* \* \* \*